(No Model.)
T. F. LEMASSENA.
MOLD FOR CORED OBJECTS OF PLASTIC MATERIAL.
No. 326,878. Patented Sept. 22, 1885.
Fig. 5.     Fig. 1.     Fig. 4.
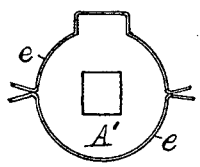 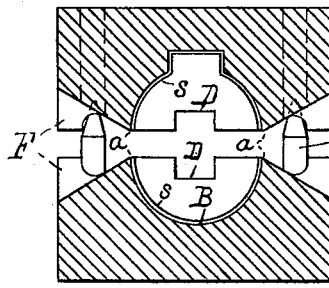 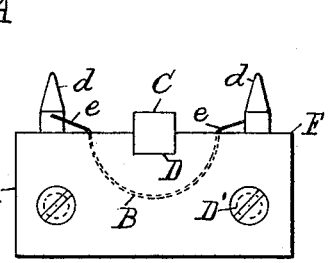
Fig. 2.
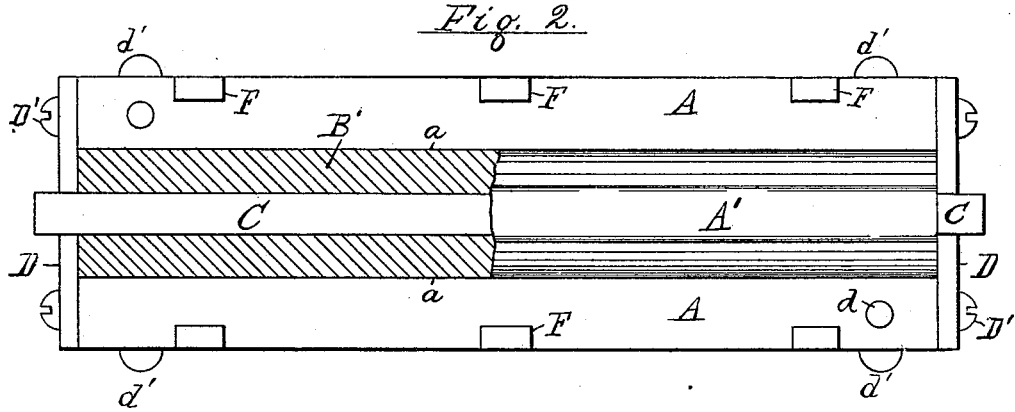
Fig. 3.
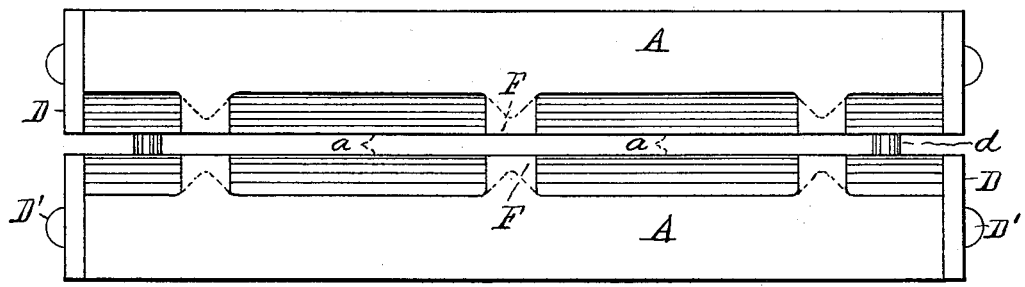
Fig. 6.
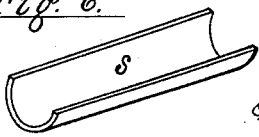
Attest.
H. J. Theberath
L. Lee
Inventor.
T. F. Lemassena per
Thos. S. Crane, Atty.

UNITED STATES PATENT OFFICE.

THEODORE F. LEMASSENA, OF NEWARK, NEW JERSEY.

MOLD FOR CORED OBJECTS OF PLASTIC MATERIAL.

SPECIFICATION forming part of Letters Patent No. 326,878, dated September 22, 1885.

Application filed September 15, 1884. (No model.)

*To all whom it may concern:*

Be it known that I, THEODORE F. LEMASSENA, a citizen of the United States, residing in Newark, Essex county, New Jersey, have invented certain new and useful Improvements in Molds for Cored Objects of Plastic Material, fully described and represented in the following specification, and the accompanying drawings, forming a part of the same.

This invention consists in an improved apparatus for molding objects of yielding or plastic substance, and is shown herein as applied to the formation of a carriage-top prop.

The improvements in the mold consist, first, in a construction divided longitudinally and having one-half provided with supports at each end for a metallic core; secondly, in the combination, with the mold, of beveled edges at the parting-line and separate stops formed on the halves of the mold to prevent such edges from sustaining any injurious pressure; thirdly, in a removable shell for producing a secondary pressure upon the contents of the mold.

In the drawings, Figure 1 is a transverse section of a mold embodying all my improvements. Fig. 2 is a plan of one half of such mold. Fig. 3 is a side elevation of the parts shown in Fig. 1, the halves of the mold in each view being somewhat separated, as when the pressure is first applied to the contents. Fig. 4 is an end view of one half of the mold provided with the coating material. Fig. 5 is an end view of a top-prop with such coating affixed by molding; and Fig. 6 is a perspective view of the detachable shell for contracting the cavity of the mold.

A A are the halves of the mold, which is intended, primarily, for the formation of cored objects, like the top-prop shown in Fig. 5.

B is the cavity, shown empty in all the figures except Fig. 2, in which a top-prop blank, A′, is shown at the right-hand end, and a material for making such prop in the left-hand end at B′.

C is the core, shown as a square bar, sustained within the cavity by guides D D, attached to opposite ends of one half of the mold. The guides are shown as plates secured to the ends of the mold by screws D′, but may be made integral therewith, if preferred.

*d d* are dowels applied to the opposite halves of the mold, to direct their closing movements in the usual manner, in lieu of which studs *d'* may be used along the edge of the mold.

The adjacent edges of the mold are beveled upon their outer sides, so as to form edges *a a*, to cut off the surplus material which may flow over such edges when the contents are compressed, and stops F are provided upon the opposed inner faces of the mold to prevent the contact of the cutting-edges under pressure sufficient to injure them.

In making a top-prop of paper-pulp or any analogous material I form the cored object in a mold of this construction in the following manner: I coat the interior of the mold with grease or any substance adapted to prevent adhesion, and may then either fill the halves separately with the plastic mixture and press the core into the same until supported in its proper position by the guides D D, or stick the plastic substance to the core itself and press the material and the core together into one half of the mold. In either case the upper half of the mold is applied to the lower, with the dowels *d d* in their appropriate sockets, and pressure is applied until the stops F come in contact. The surplus material that flows over the beveled edges F is cut off by the approximation of such edges, and the blank is then free from any waste projections when removed from the die. The core C, being rigidly held in place by the supports or guides at each end of the mold, forms an aperture in the blank at the precise spot desired, and may be removed from the blank either before or after its removal from the mold.

The mold described is equally applicable to the pressing and shaping of top-props, formed by wrapping layers of leather upon a core or mandrel, and an outer coating of leather or suitable material may be cemented to the outside of such props during the pressing operation by inserting a lining of the same in the mold with its edges overhanging, as shown in Fig. 4 at *e*. By providing both halves of the mold with such lining, and applying a suitable cement to the overhanging edges close to the mold, the contents may be shaped and covered with an apparently unbroken coating at the same time, as the pressure forces the two halves of the coating into close contact at their joint, cements them together, and trims them off by means of the cutting-edges.

After molding, the contents of the mold are liable to shrink when dried, and, if pressed a second time to shape them more perfectly, would require a smaller mold than that used in applying the primary pressure. To adapt the same mold for applying a secondary pressure to the dried blank, I provide a detachable shell or shells, s, fitted to the inner walls of the mold to diminish its cavity in precisely the required degree. When such shells are fitted within the mold, the dried blank may be laid therein and pressed a second time into the final desired shape.

In a mold intended for such shells the primary form would be necessarily different from that of the finished article, and as a shell applied to one half the mold might suffice to give the auxiliary pressure desired, it is obvious that the true cavity of the mold may be recessed out only at the point where the shell is to be afterward inserted, and that one, two, or more shells may be applied to different parts of the mold wherever the secondary pressure is required upon the pressed and dried blank.

The blank shown in the drawings may be made by this means of any convenient length, and cut up afterward into suitable pieces and finished by japanning, ready for sale.

It is obvious that the removable shell and cutting-edges shown herein may be used in molds of other forms than that shown herein, and I do not, therefore, limit myself to the particular shape or character of the mold to which they may be applied, as the same may be applied to a horse-collar mold or to any other requiring such construction.

I am aware that molds have been made with cutting-edges to sever the surplus material from the blank, and do not claim the same herein, except when combined with the isolated stops shown in the drawings.

A small channel cut in the mold around its edge would not suffice to receive the surplus material in operations of the kind contemplated in my invention, and I therefore construct the stops $f$ $f$ as isolated studs, located apart from the cutting-edges, and adapted to allow the unrestricted flow of the material from such edges when the halves of the mold are pressed together. By such construction I am enabled to operate upon a large surplus of the raw material, and to thus secure a great condensation of the mass and a more perfect conformity of the same to the interior of the mold.

My invention may be used for any material; but was designed especially for fibrous materials, such as leather scraps.

Having thus described my invention, I claim the same as follows:

1. The combination, with a mold divided longitudinally, of a metallic core supported in guides attached to one part of the divided mold.

2. The combination, with a divided mold, of the beveled edges, the open space outside of the same, and the separate stops for sustaining the closing pressure.

3. The combination, with the cavity of a mold, of a removable shell adapted for applying a secondary pressure to the blank, substantially as shown and described.

In testimony whereof I have hereunto set my hand in the presence of two subscribing witnesses.

THEODORE F. LEMASSENA.

Witnesses:
   THOS. S. CRANE,
   L. LEE.